(12) United States Patent
Kanatsu

(10) Patent No.: US 7,382,939 B2
(45) Date of Patent: Jun. 3, 2008

(54) INFORMATION PROCESSING APPARATUS, METHOD, STORAGE MEDIUM AND PROGRAM

(75) Inventor: Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/828,165

(22) Filed: Apr. 21, 2004

(65) Prior Publication Data

US 2004/0218836 A1 Nov. 4, 2004

(30) Foreign Application Priority Data

Apr. 30, 2003 (JP) ............................. 2003-125817

(51) Int. Cl.
*G06K 9/54* (2006.01)
(52) U.S. Cl. .......................... 382/305; 382/181; 707/6
(58) Field of Classification Search ................ 382/181, 382/294, 209, 219, 305; 707/1–6
See application file for complete search history.

(56) References Cited

U.S. PATENT DOCUMENTS

| 5,680,478 A | 10/1997 | Wang et al. ................ 382/176 |
| 5,991,466 A | 11/1999 | Ushiro et al. ............... 382/305 |
| 6,169,822 B1 | 1/2001 | Jung ........................... 382/296 |
| 6,397,213 B1 | 5/2002 | Cullen et al. ................... 707/5 |

FOREIGN PATENT DOCUMENTS

| CN | 1205485 A | 1/1999 |
| EP | 0 961 472 A2 | 12/1999 |
| EP | 1 073 001 A2 | 1/2001 |
| JP | 3-17851 B2 | 3/1991 |

*Primary Examiner*—Samir A. Ahmed
*Assistant Examiner*—Mehdi Rashidian
(74) *Attorney, Agent, or Firm*—Fitzpatrick, Cella, Harper & Scinto

(57) ABSTRACT

In retrieval of a registered image that resembles an input image, retrieval is performed accurately in a short period of time irrespective of orientation of the input image. Specifically, there is disclosed an information processing method for retrieving image data, which has a high degree of similarity to input image data, from registered image data, the method includes an area identification step (S402) of identifying a text area and a non-text area in the input image data; a direction identification step (S404) of recognizing text in the identified text area and identifying orientation of the input image data based upon orientation of the text recognized; a rotation step (S406) of rotating the identified input image data to a prescribed orientation based upon the orientation identified; and a retrieval step (S409) of retrieving image data, which has a high degree of similarity to the input image data after the rotation thereof, from the registered image data.

7 Claims, 5 Drawing Sheets

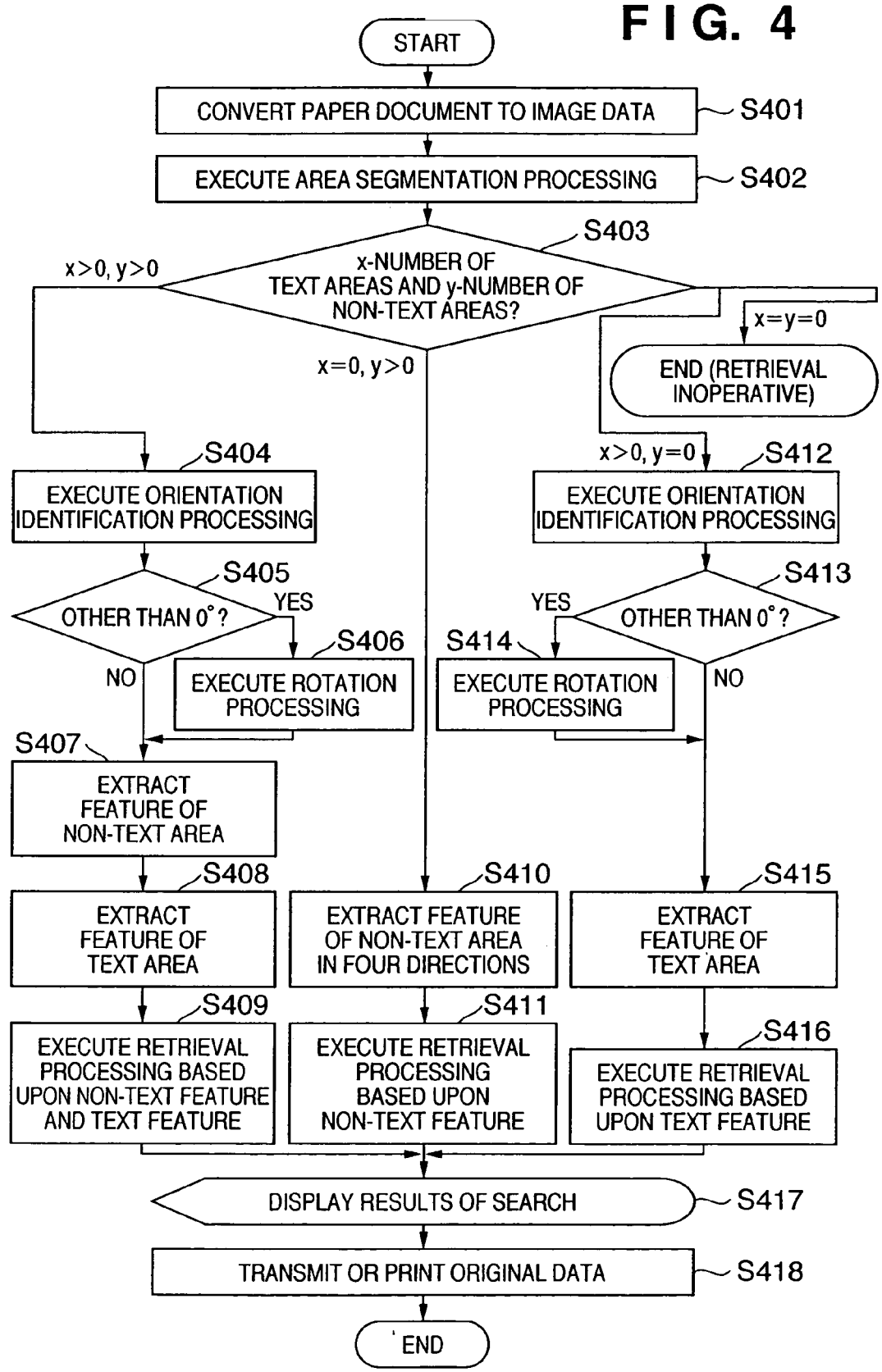

INFORMATION PROCESSING APPARATUS, METHOD, STORAGE MEDIUM AND PROGRAM

FIELD OF THE INVENTION

This invention relates to an image retrieval technique whereby image data that resembles an image read by an input device such as a scanner is searched and retrieved from a database.

BACKGROUND OF THE INVENTION

Rapid progress has been made in terms of achieving paperless systems in offices. Paper documents created on a personal computer and old paper documents that have been accumulated in a binder or the like may now be stored in a database by converting these documents to electronic documents such as image data by means of a scanner.

Materials distributed at a meeting even now are preferred to be paper documents, and there are also many opportunities for electronic documents that have been stored in a database to be printed out as paper documents which are then delivered to users.

Consider a case where a user who has received a paper document wishes to archive or transmit the document electronically or wishes to extract content from the document and reutilize it. If instead of using data obtained by putting the paper document back into electronic form it were possible to acquire the original data from a database and utilize this data, then convenience would be enhanced to the extent that loss of information through intermediate use of paper documents is eliminated.

A system that has been proposed in order to meet this need reads a paper document by a scanner and retrieves data that is similar in content from a database, as described in the specification of Japanese Patent No. 3017851.

In order to raise retrieval accuracy, the applicant has given consideration to dividing a read document (an input image) into text information and non-text information (photographs and pictures, etc.) using an area identification technique (which may be well known, for example, the technique described in the specification of U.S. Pat. No. 5,680,478) and using similarity-degree calculation processing that conforms to the characteristic of the particular information.

More specifically, the approach includes extracting a text area and a photograph area from a page image of a read document and a page image of a registered document by area identification processing, obtaining degree of similarity, which is obtained based upon the feature of a character string that has undergone character recognition processing, in regard to the text areas, and obtaining degree of similarity with regard to the photograph areas using image features such as color and edges, etc.

In particular, since a photograph or picture contained in a document page represents the feature of the page to a large extent, it can be anticipated that thus finding the degree of similarity of a photograph or picture in highly precise fashion will contribute to a major improvement in the performance of the retrieval system.

On the other hand, in relation to finding the degree of similarity between an input image and a registered image using an image feature in such a retrieval system, it is essential that the orientations of both images be the same. If the orientations are different, a high retrieval precision cannot be expected.

However, if a paper document has been read using a scanner or the like, there is a possibility that the orientation of the input image acquired will change in any of four directions depending upon the manner in which the paper is placed on the document glass. Forcing the user to place the paper in the correct manner for the purpose of solving this problem may detract from the user friendliness of the system. Moreover, depending upon the paper size, there are cases where scanning in the desired direction may not be possible owing to the structure of the document glass or automatic document feeder.

There is a method available for avoiding the problem relating to image orientation. Specifically, when degree of similarity of an image feature is calculated, a difference in image orientation is taken into account and four types of images obtained by rotation through angles of 0°, 90°, 180° and 270° with respect to the image on the input side are prepared, or four types of features are created by performing a feature coefficient conversion. Degree of similarity is then found and whichever image or feature has the highest degree of similarity is employed. Regardless of the method used, however, processing for obtaining the degree of similarity must always be executed four times and the processing time required increases fourfold.

SUMMARY OF THE INVENTION

Accordingly, an object of the present invention is to provide a technique through which it is possible to retrieve a registered image accurately in a short period of time regardless of orientation of an input image in a system for obtaining the degree of similarity between the input image and registered images and retrieving a registered image that resembles the input image.

According to the present invention, the foregoing object is attained by providing the information processing apparatus for retrieving image data, which has a high degree of similarity to entered input image data, from image data that has been registered, comprising:

area identification unit adapted to identify a text area and a non-text area in the input image data;

direction identification unit adapted to recognize text in the identified text area and identifying orientation of the input image data based upon orientation of the text recognized;

rotation unit adapted to rotate the identified input image data to a prescribed orientation based upon the orientation identified; and retrieval unit adapted to retrieve image data, which has a high degree of similarity to the input image data after the rotation thereof, from the registered image data.

In accordance with the present invention, it is possible to retrieve a registered image accurately in a short period of time regardless of orientation of an input image in a system for obtaining the degree of similarity between the input image and registered images and retrieving a registered image that resembles the input image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flowchart illustrating the flow of processing (retrieval processing) in an image processing system that implements the information processing method of the present invention.

DETAILED DESCRIPTION OF THE PREFERRED EMBODIMENT

Preferred embodiments of the present invention will now be described in detail in accordance with the accompanying drawings.

Figure 1:
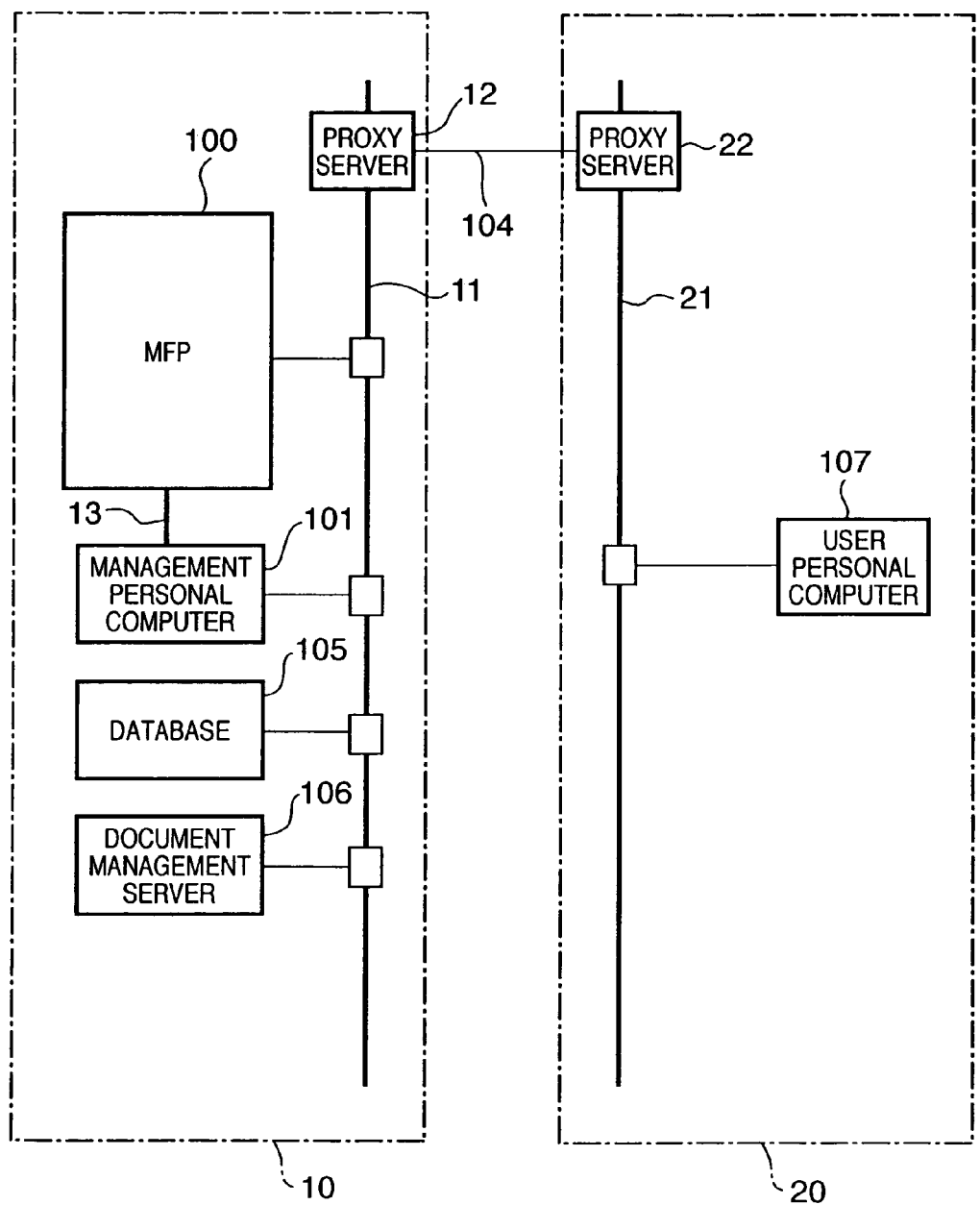
FIG. 1 is a diagram illustrating the configuration of an image processing system for implementing an information processing method according to the present invention.

FIG. 1 is a diagram illustrating the configuration of an image processing system for implementing an information processing method according to the present invention. As shown in FIG. 1, this embodiment assumes construction of an image processing system for implementing an information processing method in this invention in an environment in which offices 10 and 20 have been connected by the Internet 104.

A LAN 11 has been constructed in the office 10. Connected to the LAN 11 are an MFP 100, a management personal computer 101 for controlling the MFP 100, a document management server 106 and a database 105 thereof, and a proxy server 12. Similarly, a LAN 21 has been constructed in the office 20. Connected to the LAN 21 are a user personal computer 107 and a proxy server 22. The LAN 107 in office 10 and the LAN 108 in office 20 are connected to the Internet 104 via the proxy servers 103-1, 103-2.

In the image processing system having such a configuration, it is assumed that there is no particular limitation on storage locations of registered images that are the object of a search. Images may be stored in a storage device (described later) within the MFP 100, on a hard disk (not shown) within the management personal computer 101 and in a database (105) of the document management server 106. However, it is assumed that storage locations are externally accessible via the LAN 11 or 12 in such a manner that the registered images thus stored can be retrieved.

Further, it is assumed that the information processing method (retrieval function) according to the present invention can be implemented at any device in the image processing system shown in FIG. 1. For example, a data processor (described later) within the MFP 100 may have the retrieval function, the management personal computer 101 may have the retrieval function and the document management server 106 may have the retrieval function.

The MFP 100 takes charge of processing for reading images of paper documents and part of the image processing applied to the image signals that have been read. The image signals are input to the management personal computer 101 using the LAN 13. The management personal computer 101 is an ordinary personal computer that is provided internally with image storage means, image processing means, display means and input means, though some of these are an integral part of the MFP 100.

Figure 2:
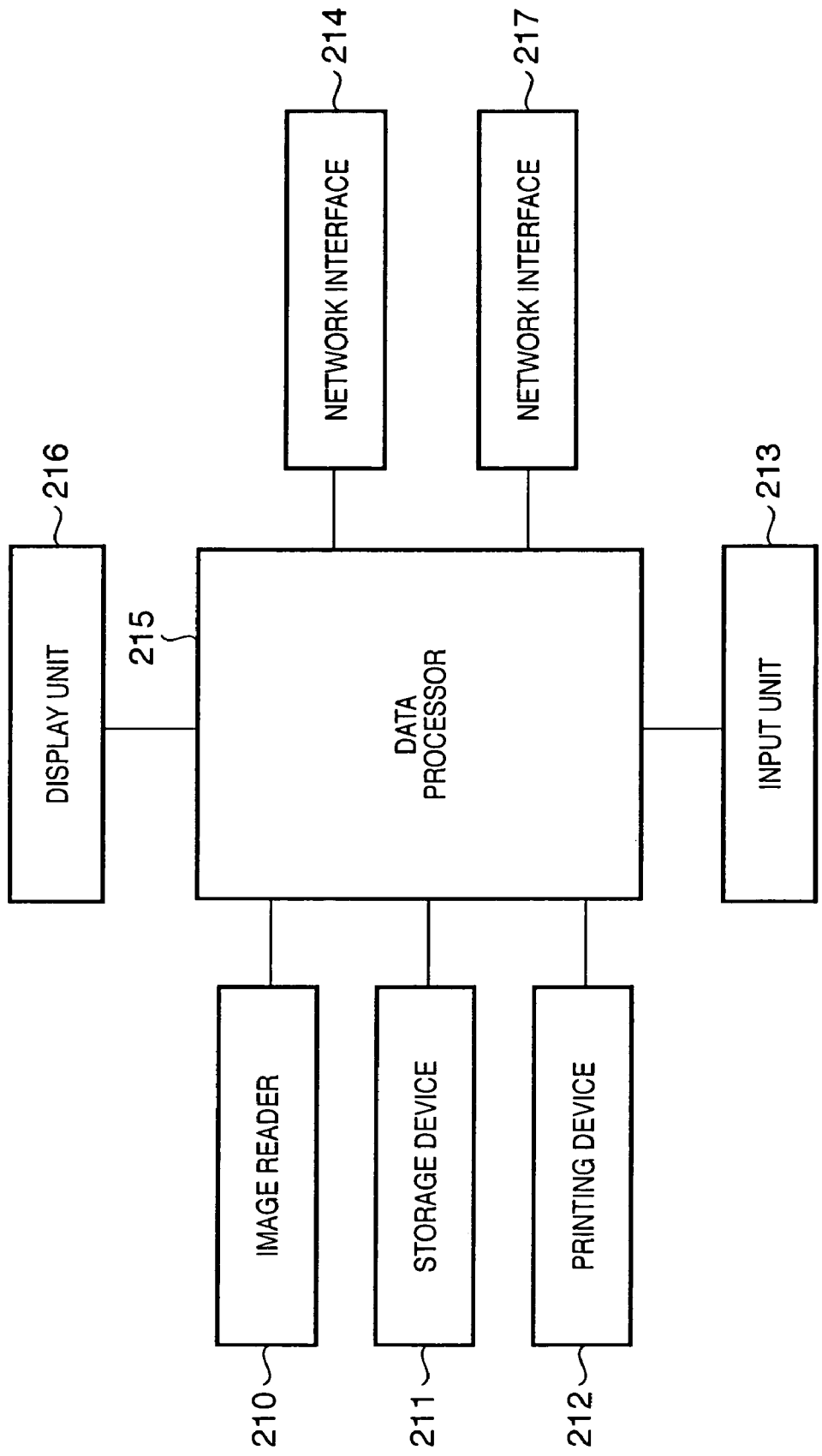
FIG. 2 is a block diagram showing the details of an MFP.

FIG. 2 is a block diagram of the MFP 100. As shown in FIG. 2, the MFP 100 has an image reader 210, which includes an automatic document feeder (referred to as an "ADF" below), for illuminating stacked paper documents or a single paper document by a light source (not shown), forming a reflected image of the document on a solid-state electronic image sensing device by a lens and obtaining a raster image signal from the solid-state electronic image sensing device as 600-dpi image information.

In the case of ordinary copying processing, this image signal is converted to a print signal by a data processor 215. If a plurality of sheets are to be copied, then one page of print data is stored temporarily in a storage device 211, after which the data is output to a printing device 212 successively so that the image is printed on paper. In a case where transmit processing is executed, the image information is converted to a compressed-image file format such as TIFF or JPEG or to a network-file format such as PDF and then is output from a network interface 214. The output file is transmitted to the document management server 106 via the LAN 11 of FIG. 1 or is transferred to another user personal computer 107 via the Internet 104. In a case where print processing is executed, print data transmitted from the user personal computer 107 is received via the network interface 214 and converted to printable raster data by a data processor 215, after which the print image represented by this data is formed on paper by the printing device 212. Commands from the operator to the MFP 100 are entered via a key control panel with which the MFP 100 is equipped and an input unit 213 having a keyboard and mouse that apply an input to the management personal computer 101. This series of operations is controlled by a controller (not shown) within the data processor 215.

A display unit 216 presents a display showing the status of operational inputs and a display of image data that is undergoing processing. The storage device 211 also is controlled by the management personal computer 101. Exchange and control of data between the MFP 100 and management personal computer 101 are implemented via network interface 217 and the directly connected LAN 13.

Overall processing that includes processing based upon the information processing method of the present invention in the image processing system shown in FIG. 1. In order to simplify the description, it will be assumed that a database having registered images has been constructed on the hard disk (not shown) of the management personal computer and that the information processing method of the invention is implemented by operating the management personal computer 101 and MFP 100 together.

Figure 3:
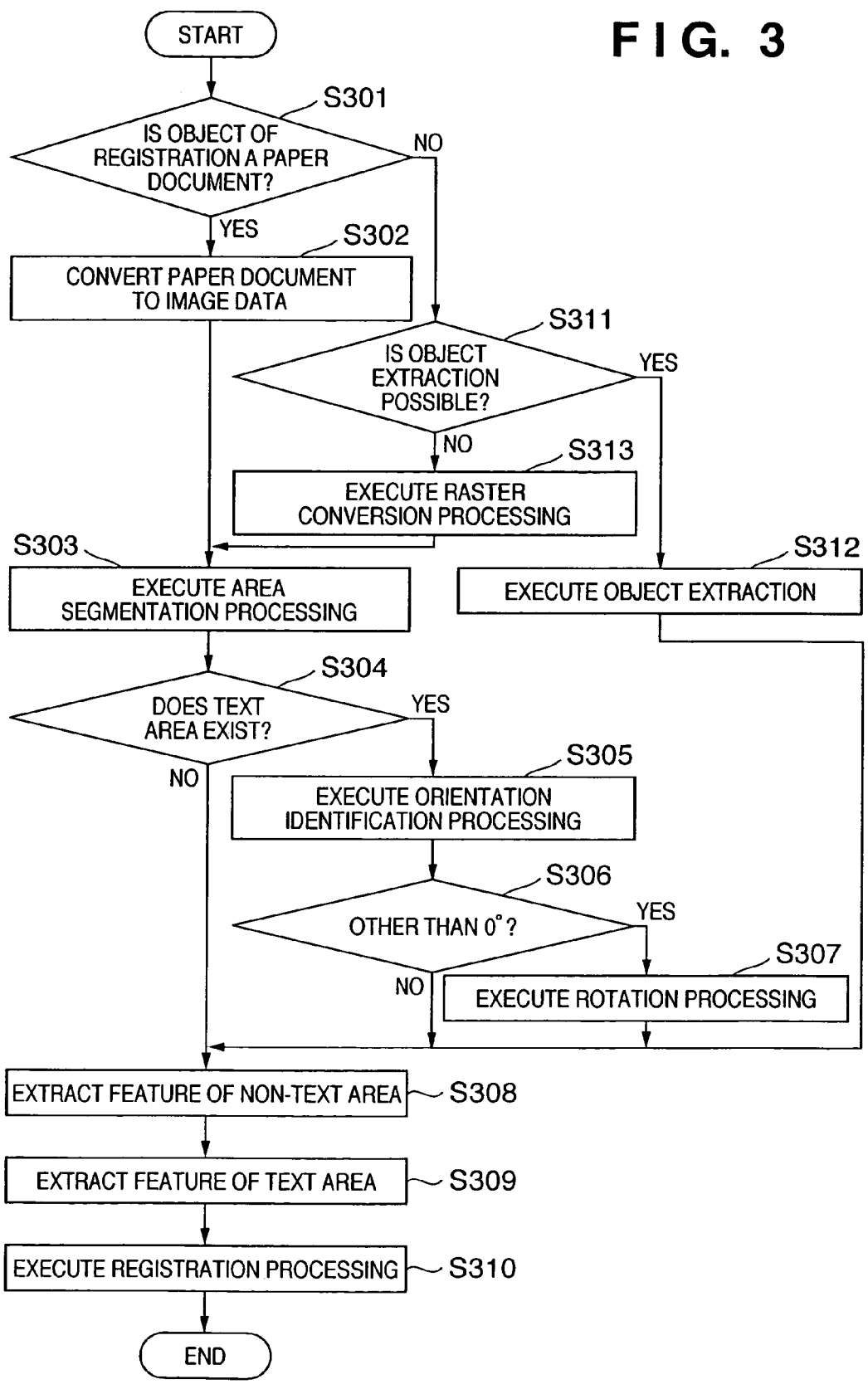
FIG. 3 is a flowchart illustrating the flow of processing (registration processing) in an image processing system that implements the information processing method of the present invention.

Processing executed in this embodiment is divided into registration processing and retrieval processing. In registration processing, processing is executed for extracting features necessary for retrieving registered images, and processing is executed for storing extracted features and data in the database 105 in correlated form. This will be described in order with reference to FIG. 3.

First, processing branches depending upon whether the object of registration is a paper document or an electronic document that has been created by personal computer software (step S301).

If the object of registration is a paper document, control proceeds to step S302 where the paper document is converted to a page image using the image reader of the MFP 100.

Figure 5B:
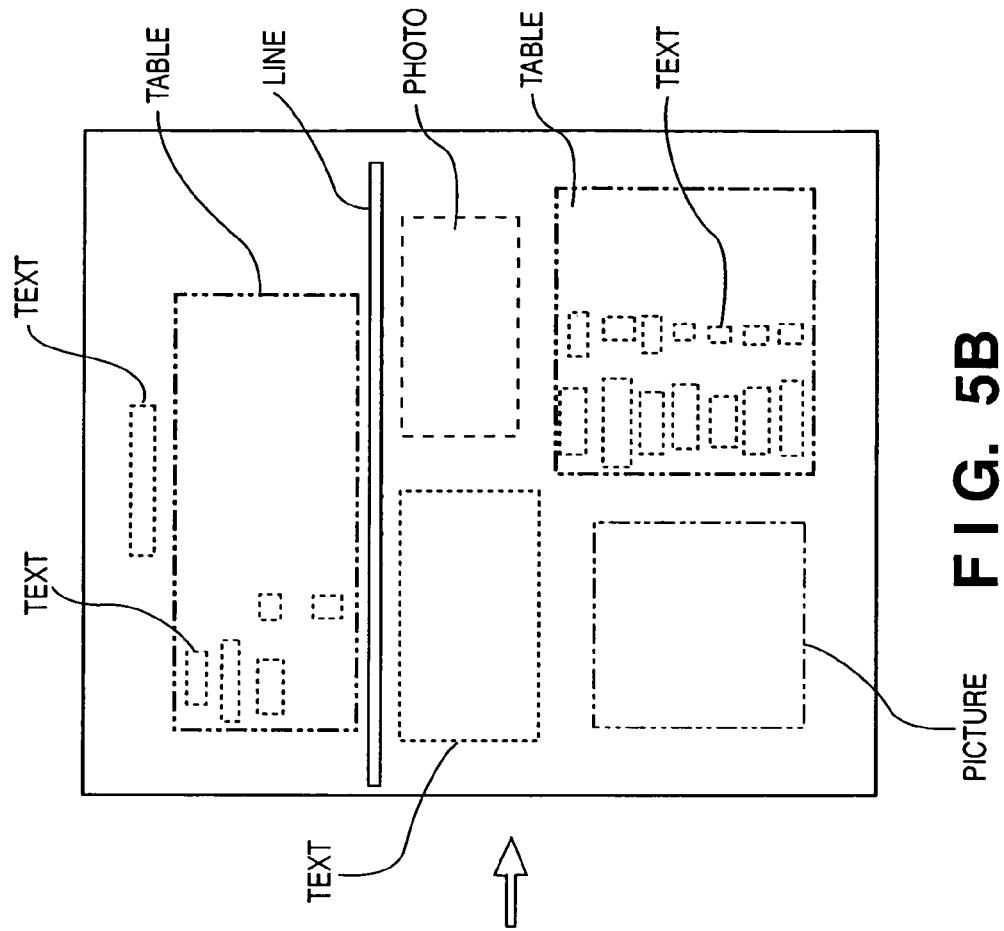
FIGS. 5A and 5B are diagrams illustrating an example of area segmentation processing applied to a page image.
Figure 5A:
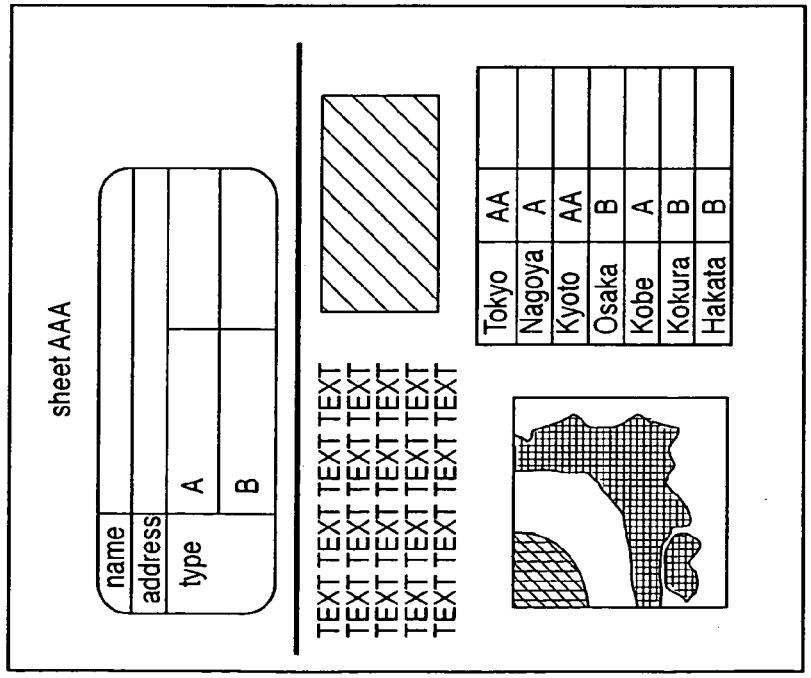

Next, at step S303, the page image is subjected to area segmentation processing, whereby a text area and a non-text area having a photograph or picture are extracted. More specifically, the coordinates of a circumscribed rectangle of each area are obtained. Area segmentation processing is processing for dividing the page image of the document into objects having document-like characteristics. FIGS. 5A and 5B illustrate how this is done. An area identified as a text area in the image of FIG. 5A by area segmentation processing is indicated as "TEXT" in FIG. 5B. Further, areas identified as non-text areas are indicated as "TABLE", "PHOTO" and "PICTURE" in FIG. 5B. The processing technique relating to area segmentation processing is disclosed in various well-known literature beginning with the specification of U.S. Pat. No. 5,680,478 and need not be described here.

Next, if it is determined at step S304 that a text area has been extracted from the page image, control proceeds to step S305. If a text area has not been extracted, control proceeds directly to step S308. Processing for identifying the original top-bottom orientation of the page image is executed at step S305.

Processing for identifying the top-bottom orientation at step S305 will be described in simple terms. First, several characters are selected and cut from the text area to obtain character images and each of the character images is rotated by 0°, 90°, 180° and 270°. The images thus obtained are subjected to character recognition processing in respective ones of the directions. The character recognition processing is well known. An example that can be mentioned is processing for extracting an edge component from a character image and converting the component to a feature vector, obtaining the degree of similarity to feature vectors in a dictionary in which character types have been registered in advance, and adopting the character having the highest degree of similarity as the result of recognition. Further, this degree of similarity is accumulated over several characters in each of four directions, the accumulated results are adopted as the scores in each of the directions and the direction that has the highest score is eventually determined to be the original direction.

If it is determined at step S306 that the direction obtained at step S305 is other than 0°, control proceeds to step S307, where rotation processing for re-orienting the page image in the correct direction is applied to the page image. At the same time, the rotational conversion is applied also to the coordinates of the rectangle of the area extracted at step S303. It should be noted that instead of rotating the coordinates of the rectangle in order to raise the precision of area segmentation, it may be so arranged that this area is discarded and a new area is obtained by applying area segmentation to the rotated page image again.

Next, at step S308, non-text areas in the page image are adopted as a single item of non-text image information and feature extraction for use in retrieval later is performed. Feature extraction in an image is assumed to rely upon a well-known processing method and is not described in detail here. One method that can be mentioned includes dividing an image into meshes and vectoring the average color of each area as an element.

Next, at step S309, the interiors of all text areas in the page image are subjected to character recognition to obtain character code strings and the character code strings are adopted as text features of the registered image. A well-known technique similar to that described above is used in character recognition.

If it is determined at step S301 that the input is other than a paper document, then it is determined at step S311 whether it is possible to directly extract an image object of a non-text portion or a character-string object of a text portion from an electronic document. An example in which extraction is possible is a case where internal text is analyzed and an image or text extracted from data described in HTML. On the other hand, whether object extraction from application data such as word processing software is possible or not is a problem that depends largely on the individual application. Though the details cannot be described here, extraction is deemed possible if programs for object extraction are available.

If it has been determined that object extraction is possible, then control proceeds to step S312, where object extraction is carried out. Control subsequently proceeds to step S308, at which a text feature is extracted from the text object. Then, at step S309, an image feature is extracted adopting an image object as a non-text area.

If it has been determined that object extraction is not possible, then control proceeds to step S313, at which a conversion from an electronic document to a page image is performed. This processing can be executed utilizing, as the printing function of the MFP 100, part of the processing implemented in the data processor 215, that is, processing for converting the electronic document to raster data capable of being printed on paper. Alternatively, if the electronic document is generated by a specific application and the application itself or additional software has function for rasterizing the electronic document, then this may be utilized. From this point onward, the page image that has been converted from the electronic image is subjected to processing from steps S303 to S310 in a manner similar to that of the scanned image.

Finally, data in which the three items of registered image, text feature and image feature constitute a set is registered in the database 105 at step S310 as information relating to registered data. It should be noted that the term "original data" refers to a page image if a paper document has been scanned in or, if the object of registration is the original electronic document, then to the relevant data itself.

In retrieval processing, a feature serving as a search key is extracted from a page image obtained by scanning a paper document as a search key, the extracted feature is compared with a group of features in the database 105 and data having the highest degree of similarity is output as the result or is adopted as the object of processing desired by the user, for example, transmission, printing or archiving. This will be described in order with reference to FIG. 4.

First, at step S401, a paper document serving as a search key is converted to a page image using the image reader of the MFP 100.

Next, at step S402, the page image is subjected to area segmentation processing and a text area and a non-text area, which has a photograph or picture, are extracted. The content of this processing is equivalent to that of step S303 in FIG. 3.

Processing branches at step S403 depending upon the number of text and non-text areas that have been obtained from the page image.

If both text and non-text areas have been found, control proceeds to step S404. If a non-text area has been found but a text area has not, then control proceeds to step S410. Furthermore, if only a text area has been found and not a non-text area, then control proceeds to step S412. If neither text nor non-text areas have been found, processing is terminated on the grounds that retrieval is not in operation.

If both text and non-text areas have been found, then the original top-bottom orientation of the page image is discriminated at step S404 using the text area found.

If it is determined at step S405 that the top-bottom orientation obtained at step S305 is other than 0°, control proceeds to step S406, where rotation processing for re-orienting the page image and coordinates of the rectangle in the correct direction is applied. It is permissible to rotate only the image within the coordinates of the rectangle on a per-area basis and not the entire page image.

Next, at step S407, a feature of the non-text area image is obtained and is adopted as an image feature of search key data. Then, at step S408, the interior of the text area is subjected to character recognition to obtain a character string that is adopted as the text feature of the search key data.

Matching is performed at step S411 one by one between each feature of the search key data and features of a plurality of items of data that have been registered in the database 105, and data items having a high degree of similarity are adopted as retrieval candidates at step S409.

Any of various well-known methods may be used to calculate degree of similarity relating to individual features. In case of an image feature, one method is to use degree of similarity obtained by converting, to numerical form, the shortness of distance between feature vectors and the correlation among the number of images on the page. In case of a text feature, one method is to select several words, which serve as keywords, from an entire character string in search key data by part-of-speech analysis or frequency of occurrence, and adopt the number of these words that appear on the side of the registered data as the degree of similarity.

In order to decide the overall degree of similarity from two features, it will suffice to decide appropriate coefficients (a, b) and calculate a×N+b×M, where N represents the degree of similarity obtained using the image feature and M the degree of similarity obtained using the feature of the text. With regard to the values of the coefficients (a, b), fixed values may be used, the values may be changed depending upon the distribution of text and images in the original, or the distribution can be set at will by the user.

If it is found at the branch step S403 that only a non-text area could be found, then control proceeds to step S410, where image features of the non-text area are extracted from respective ones of images obtained by rotation through 0°, 90°, 180° and 270°. Alternatively, feature extraction from the image is performed only once and an appropriate conversion is applied to this feature to obtain, by calculation, features equivalent to those obtained from the images rotated through 0°, 90°, 180° and 270°.

Matching is performed one by one between the image features of the search key data and image features of a plurality of items of data that have been registered in the database 105. At this time four degrees of similarity are obtained among the features in the four directions and the value having the highest degree of similarity is employed. Processing similar to that of step S409 is used as the method of calculating degree of similarity of the image features. Data having the highest degree of similarity among the data that has undergone matching is adopted as a retrieval candidate.

If it is found at the branch step S403 that only a text area could be found, then control proceeds to step S412, where the original top-bottom orientation of the page image is discriminated. If it is determined at step S413 that the top-bottom orientation is other than 0°, control proceeds to step S414, where rotation processing for re-orienting the page image and coordinates of the rectangle in the correct direction is applied. It is permissible to rotate only the image within the coordinates of the rectangle on a per-text-area basis and not the entire page image.

Next, at step S415, matching is performed one by one between the text features of the search key data and text features of a plurality of items of data that have been registered in the database 105, and data having a high degree of similarity is output as a retrieval candidate. Processing similar to that of step S409 is used as the method of calculating degree of similarity of the text features.

The results of the search are displayed at step S417. Only data having the highest degree of similarity may be displayed, or data having a degree of similarity higher than a predetermined threshold value may be displayed as candidates and the final selection may be left up to the user.

Finally, at step S418, the result of the search, namely the original data, is subjected an operation desired by the user, for example, to transmission or printing.

Thus, as should be obvious from the description above, the present embodiment is such that in a system for retrieving data, which resembles an input image obtained by scanning a printed document, from the database 105 in which paper documents and electronic documents have been registered, a degree-of-similarity calculation that takes orientation into account automatically is performed without giving consideration to the orientation of a document when the paper document is scanned. If the document is one that contains at least text, it is possible to prevent an increase in processing time relating to calculation of degree of similarity of image features, thereby enhancing the convenience of the system as a retrieval system.

The present invention can be applied to a system constituted by a plurality of devices (for example, a host computer, interface, reader, printer, etc.) or to an apparatus comprising a single device (for example, a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (for example, a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiment.

The present invention is not limited to the above embodiment and various changes and modifications can be made within the spirit and scope of the present invention. Therefore, to apprise the public of the scope of the invention, the following claims are made.

What is claimed is:

1. An information processing apparatus for retrieving image data having a high degree of similarity to entered input image data, from image data that has been registered, comprising:
    an area identification unit adapted to identify text area and non-text area in the input image data;
    a direction identification unit adapted to recognize text in the identified text area and to identify an orientation of the input image data based upon the orientation of the recognized text;
    a rotation unit adapted to rotate the identified input image data to a correct direction based upon the identified orientation of the input image data;
    a first retrieval unit, wherein, if said area identification unit identifies that the input image data contains both text area and non-text area, said first retrieval unit is adanted to extract a feature of the text area in the correct direction and a feature of the non-text area in the correct direction from the input image data rotated to the correct direction by said rotation unit, and to retrieve image data having a high degree of similarity to the input image data, from the image data that has been registered, based on the extracted feature of the text area and the extracted feature of the non-text area;
    a second retrieval unit, wherein, if said area identification unit identifies that the input image data contains text area but does not contain non-text area, said second retrieval unit is adapted to extract a feature of the text area in the correct direction from the input image data rotated to the correct direction by said rotation unit, and to retrieve image data having a high degree of similarity to the input image data, from the image data that has been registered, based on the extracted feature of the text area; and,
    a third retrieval unit, wherein, if said area identification unit identifies that the input image data contains non-text area but does not contain text area, said third retrieval unit is adapted to extract a feature of the non-text area in each of a plurality of directions from the input image data, and to retrieve image data having a high degree of similarity to input image data, from the image data that has been registered, based on the extracted feature in each of the plurality of directions,
    wherein said first retrieval unit does not extract a feature of the text area in a direction other than the correct direction and a feature of the non-text area in a direction other than the correct direction, and
    said second retrieval unit does not extract a feature of the text area in a direction other than the correct direction.

2. The apparatus according to claim 1, wherein the plurality of directions are directions of rotation through 0°, 90°, 180° and 270° in a case where orientation of the input image data is 0°.

3. The apparatus according to claim 1, wherein the registered image data has been registered in a state where a text area and a non-text area have been identified by said area identification unit, orientation has been identified by said orientation identification unit based upon text in the text areas and rotation has been applied to the correct direction by said rotation unit.

4. An information processing method for retrieving image having a high degree of similarity to entered input image data, from image data that has been registered, comprising:
    an area identification step of identifying text area and non-text area in the input image data;
    a direction identification step of recognizing text in the identified text area and identifying an orientation of the input image data based upon the orientation of the recognized text;
    a rotation step of rotating the identified input image data to a correct direction based upon the identified orientation of the input image date;
    a first retrieval step, wherein, if it has been identified in said area identification step that the input image data contains both text area and non-text area, said retrieval step extracts a feature of the text area in the correct direction and a feature the non-text area in the correct direction from the input image data rotated to the correct direction in said rotation step, and retrieves image data having a high degree of similarity to the input image data, from the image data that has been registered, based on the extracted feature of the text area and the extracted feature of the non-text area;
    a second retrieval step, wherein, if it has been identified in said area identification step that the input image data contains text area but does not contain non-text area, said second retrieval step extracts a feature of the text area in the correct direction from the input image data rotated to the correct direction in said rotation step, and retrieves image data having a high degree of similarity to the input image data, from the image data that has been registered, based on the extracted feature of the text area,
    a third retrieval step, wherein, if it has been identified in said area identification step that the input image data contains non-text area but does not contain text area, said third retrieval step extracts a feature of the non-text area in each of a plurality of directions from the input image data, and retrieves image data having a degree of similarity to input image data, from the image data that has been registered, based on the extracted feature in each of the plurality of directions,
    wherein the feature of the text area in a direction other than the correct direction and the feature of the non-text area in a direction other than the correct direction are not extracted in said first retrieval step, and
    the feature of the text area in a direction other than the correct direction is not extracted in said second retrieval step.

5. The method according to claim 4, wherein the plurality of directions are directions of rotation through 0°, 90°, 180° and 270° in a case where orientation of the input image data is 0°.

6. The method according to claim 4, wherein the registered image data has been registered in a state where a text area and a non-text area have been identified at said area identification step, orientation has been identified at said orientation identification step based upon text in the text area, and rotation has been applied to the correct direction at said rotation step.

7. A computer readable recording medium storing a control program for causing a computer to implement the information processing method set forth in claim 4.

* * * * *

UNITED STATES PATENT AND TRADEMARK OFFICE
CERTIFICATE OF CORRECTION

PATENT NO. : 7,382,939 B2  Page 1 of 1
APPLICATION NO. : 10/828165
DATED : June 3, 2008
INVENTOR(S) : Tomotoshi Kanatsu It is certified that error appears in the above-identified patent and that said Letters Patent is hereby corrected as shown below:

COLUMN 9:

Line 23, "adanted" should read --adapted--.

COLUMN 10:

Line 12, "date;" should read --data;--.

Signed and Sealed this

Eighteenth Day of November, 2008

JON W. DUDAS
*Director of the United States Patent and Trademark Office*